| United States Patent [19] | [11] Patent Number: 4,539,036 |
| Naschberger | [45] Date of Patent: Sep. 3, 1985 |

[54] METHOD OF FACILITATING VEGETATION

[75] Inventor: Stefan Naschberger, Oberau, Austria

[73] Assignee: Biochemie Gesellschaft m.b.H., Tyrol, Austria

[21] Appl. No.: 581,570

[22] Filed: Feb. 21, 1984

[30] Foreign Application Priority Data

Feb. 24, 1983 [AT] Austria ................................. 637/83

[51] Int. Cl.³ .............................................. C05F 11/08
[52] U.S. Cl. ............................................. 71/11; 71/5;
71/27; 71/903; 405/264
[58] Field of Search ........................ 71/5, 11, 27, 903;
405/263, 264

[56] References Cited

U.S. PATENT DOCUMENTS 4,317,671 3/1982 Willisch ..................................... 71/9
4,393,166 7/1983 Reischl .............................. 71/12 X

OTHER PUBLICATIONS

CA 12585z, vol. 76, 1972, p. 408, Bodo et al, "Soil Amendment of Polymer Dispersions".
CA 50541, 1983, Morrey et al, "An Experimental Evaluation . . . ".

Primary Examiner—Ferris H. Lander
Attorney, Agent, or Firm—Gerald D. Sharkin; Richard E. Vila; Frederick H. Weinfeldt

[57] ABSTRACT

The invention provides a method of facilitating vegetation with the aid of a fungal mycelium biomass in admixture with a polybutadiene and application forms comprising such components.

19 Claims, No Drawings

METHOD OF FACILITATING VEGETATION

The recultivation of soil having no erosion-preventing plant cover either due to natural phenomena (floods, landslides etc.) or to human or mechanical interference (levelling, excavation, road embankments, ski-runs, slag heaps etc.) is relatively unproblematic under favourable soil and climatic conditions.

However, under extreme soil or climatic conditions, e.g. in sand-dunes or under alpine climate conditions, the absence of erosion-preventing plant cover can have dramatic consequences. One aim of this invention is to supply humus resp. humus generating substances to soil requiring such treatment and to provide vegetation in order to prevent erosion, such as water and/or wind erosion. Another aim of the invention is to provide compositions facilitating vetegation and/or germination of seeds.

Hitherto, various methods of improving soil structure and/or soil humus content have been proposed. Depending on the application technique, one can distinguish between the hydro-seeding and mulching. Both these techniques have the disadvantage that they require large quantities of ingredients such as peat, cellulose, compost, alginate, straw, hay or other organic substances. The hydro-seeding technique requires e.g. 8000 l peat or other organic compounds (3000–4000 kg), 200 to 600 kg erosion protecting material (stabilizers) and 10,000 to 15,000 l water per hectare. Mulching requires up to 5,000 kg straw per hectare and 2500 kg each of bitumen emulsion and water per hectare. The supply of such quantities causes, however, particularly at higher altitudes considerable transport problems. The even distribution of the many components causes additional costs. Moreover, these techniques do not lead to the desired results (see i.a. Karl Reuss in "Leichtweiss-Institut für Wasserbau der technischen Universität Braunschweig, Mitteilungen", Heft 72/1982, page 99 to 106).

Under unfavourable climatic conditions, e.g. such as present at high altitudes, rotting of the mulch materials proceeds too slowly. This impairs plant growth and favours the development of phytopatogenic microorganism.

In general the high amounts of erosion protecting materials such as polybutadiene based soil stabilizers required in the hydro-seeding technique (ca. 200 to 600 kg of polybutadiene per ha), cause severe inhibition of germination.

Fungal mycelium biomass, though having excellent fertilizing properties, do not provide sufficient soil stability under severe erosive climatic conditions to allow the timely germination of seeds.

It has now surprisingly been found that the application of a fungal mycelium biomass in conjunction with a polybutadiene, allows a substantial reduction of the recommended amount of polybutadiene to be applied.

The invention therefore provides a method of facilitating vegetation in soil, comprising applying to said soil a fungal mycelium biomass and a polybutadiene.

The method of the invention provides optimal germination conditions, particularly when the soil to be treated is severely subject to erosion.

The term fungal mycelium biomass is intended to embrace any mycelial material basically resulting from fungus production, whether used as such or enriched by the addition of nutritients, e.g. such containing K, Mg or N. A suitable fungal mycelium biomass is e.g. the waste product remaining after fermentation of a penicillum fungus in an appropriate medium, subsequent to separation of the penicillin and drying of the the resulting biomass. The biomass has conveniently a dark colour.

The term polybutadiene is intended to embrace any liquid polymeric product based on butadiene and equivalents thereof, polymerising tridimensionally by cross linking (lattice-like polymerization) in the soil in the presence of oxygen. Such non-film-forming polymers have the advantage that they do not impair rain permeability in the stabilized soil (see i.a. "Erosionsküvettenversuche" by Josef Mayrhofer, Selbstverlag 1970, Bundesversuchsinstitut für Kulturtechnik und Technische Bodenkunde, D-3252 Petzenkirchen).

Fungal mycelium biomass particularly suitable for use in the invention comprises conveniently a high proportion of organic material, e.g. 70% or more, as well as the main nutritients nitrogen, P and K. A high proportion of organic matter allows for slow release of the nutrients, which is especially appropriate for plants usually found in soils with a poor humus content and having relatively low nutrient demands.

The nitrogen present in the fungal mycelium biomass is conveniently organic. The C/N ratio of the fungal mycelium biomass employed should conveniently be such, that it allows a relatively fast mineralisation under temperature and water conditions which are favourable for the germination or vegetation. A suitable C/N ratio is not greater than 15:1; a C/N ratio of ca. 8:1 is advantageous.

Any additives (such as K, Mg, N) may be added during the preparation of the fungal mycelium biomass or directly to the composition as used in the method of the invention before its application to the soil locus to be treated.

The above defined mycelium biomasses are known and some of them are commercially available for use as fertilizers. Their preparation is either known or can be effected analogously to known processes. An example of a commercially available fungal mycelium biomass is the dried granular biomass of the mycelial fungus *Penicillium chrysogenum* (Trade Mark Biosol ®) having the following composition:

| | |
|---|---|
| organic matter at least | 70% |
| nitrogen (organic) | 5–7% |
| phosphorus ($P_2O_5$) | 1–2% |
| potassium ($K_2O$) | 3–4% |
| calcium (CaO) | 3–5% |
| magnesium (MgO) | 0.5–1.5% | including substantial amounts of trace elements and vitamins. This product is enriched with K and Mg. The values for $K_2O$ and MgO in the untreated product are about 1.2% and 0.25% resp.

The polybutadiene material particularly suitable for use in the method of the invention is a liquid air-drying 1,3-butadiene homo- or copolymer; it has conveniently a maximum viscosity of 2000 mPa.s at 20° C., and has preferably a cis-1,4-double bond content of at least 30%, more preferably of 70% or more. Suitable liquid polybutadienes have a molecular weight in the range from 500 to 20,000, more particularly 750 to 5000.

An example of a polybutadiene product suitable for use in the method of the invention is the commercially available soil stabiliser having a density of 0.91 g/cm³ and a viscosity at 20° C. of 790±10% mPa.s (Trade Mark Hüls 801).

The method of the invention provides a good erosion protecting effect under conditions which are favourable for the germination. It has the advantage that it allows a substantial reduction of the amount of polybutadiene required (resp. recommended) when employing conventional recultivation or soil stabilizing methods (in general of approximately 50%). This may be illustrated by the following tests.

Erosion Prevention Efficiency (E.P.E) Test

The E.P.E. of the method of the invention was i.a. established by laboratory tests with the aid of the rinsing apparatus according to Schönthaler (Zeitsschrift für Vegetationstechnik 2, 27–34 (1979) with test dosages equivalent to mixtures of 1500–2000 kg/ha of fungal mycelium and 150 to 200 kg/ha of polybutadiene.

In seed dishes (60×60 cm) filled with sand (a layer of 3 cm) and, on top of it, 1 cm of tennis sand is sown a lawn seed mixture and the surface then treated with a mixture according to the invention.

The surface is allowed to dry during 48 hours at ca. 20° C. and then rinsed with water at a rate of 2 l/minute, whereby the treated surface is kept at an inclination of 35° under the spray nozzle.

The eroded material is determined gravimetrically.

Representative test results are as follows:

| Amount of tested product | EPE in % |
|---|---|
| 0 (contol) | 0 |
| 150 g/m² fungal mycelium⁽¹⁾(A) | 84 |
| 15 g/m² polybutadiene⁽²⁾(B) | 86 |
| 150 g/m² A + 15 g/m² B | 98 |
| 20 g/m² B | 95 |
| 150 g/m² A + 20 g/m² B | 98 |

[1] in the form of BIOSOL ®
[2] in the form of HULS 801 ®

Germination Test

The influence of the method of the invention on germination was i.a. investigated by laboratory tests with seeds of *Festuca rubra* "Koket" under simulated high altitude climate conditions:
Temperature: 0–11° and once a week 8 hours at 22°
Relative humidity: more than 90%.
The duration of the test was 44 days after seeding. Various substrates have been tested, whereby the results observed in the sand substrate and in the soil with low humus content are of particular interest.

20 g/m² of B in a soil with low humus content cause a germination depression of an average of 15%. This germination depression is compensated by the addition of 150 g/m² of A.

The relatively strong germination depression caused by the application of 20 g/m² of B alone in sand could not be compensated by the addition of 150 g/m² of A. However, the combination of 150 g/m² of A with 5, 10 and 15 g/m² of B resulted in an improved germination pattern—in the same substrate—compared with that observed for the untreated control.

In view of the test results the method of the invention is particularly indicated for use in regions where soil erosion is strong and/or where seed germination is difficult. Examples of such regions are i.a. levelled ski-runs, particularly such under extreme climatic conditions (e.g. at high altitudes), and sand-dunes. The amount of the mixture resp. the ratio of the mixture components to be applied to attain the desired effect will depend on various factors such as climatic (e.g. rain intensity) and geographic (e.g. altitude, gradient of slopes, conditions and the soil quality. In general, satisfactory results are obtained when 1500 to 2000 kg/ha of fungal mycelium biomass are applied in admixture with 50–200, particularly 50–150 kg/ha of polybutadiene.

In regions severely affected by erosion (e.g. alpine ski-slopes, steep slopes with gradient of more than 50%) it may be advantageous to use relatively high amounts, e.g. 150–200 kg/ha, of polybutadiene. Under less extreme conditions, it will, in general, be advantageous to apply less e.g. 100 kg/ha) polybutadiene.

The method of the invention is preferably effected by applying the fungal mycelium material in admixture with polybutadiene in an aqueous application form.

A suitable application form will comprise from 150 to 200 kg of fungal mycelium biomass and from 5 to 20 kg of polybutadiene in 600 to 1000 water; these amounts will suffice for a treatment of 1000 m².

Preferred application forms of the invention will also comprise a seed mixture particularly of *Festuca rubra* e.g. in an amount of 15 to 20 kg seed mixture per 600–1000 l water.

The above application forms for the method of the invention also form part of the invention.

Where acid soils (pH between 4 and 6) are treated, it may be advantageous to apply additionally fertilising lime, e.g. at a rate of 500 to 1500 kg (for example 1000 kg) per hectare of treated locus. Such lime may also be added to the application form (e.g. at a rate of 50 to 150 kg/per 600 to 1000 of water). Where the soil is extremely acid (pH below 4), it is advantageous to apply additional amounts of lime; these are conveniently applied separately, some days prior to the application of the fungal mycelium/polybutadiene mixture.

The invention may be illustrated by the following examples.

EXAMPLE 1

For slopes with a gradient of up to 50%.

300 to 400 kg of fungal mycelium (with or without enrichment with N, K or Mg) are added to an appropriate vessel (hydroseeder) and stirred with 1200 to 1600 of water. 20 kg of liquid polybutadiene (e.g. the compound B, as such or in the form of a 40 kg 50% emulsion) and 30 to 40 kg seed mixture are then added and after sufficient stirring applied to the locus to be treated, e.g. by sprinkling. The quantity is sufficient for the treatment of approximately 2000 m². The time of application is preferably elected such that a rain-free period of at least 8 hours is guaranteed.

EXAMPLE 2

For steep slopes with a gradient of more than 50%.

One proceeds analogous to Example 1, except that 40 kg of liquid polybutadiene instead of 20 kg are added.

EXAMPLE 3

For flat and steep slopes having a soil acidity of pH 4 to 6.

One proceeds analogous to Example 1 (for slopes with a gradient of up to 50%) resp. to Example 2 (for slopes with a gradient of more than 50%), except that additionally 200 kg of fertilising chalk (carbonic chalk, milled; 90–95% $CaCO_3$, some % $MgCO_3$) are added to the aqueous mixture.

Extremely acid soil (pH<4) may require, depending on the pH-value additional amounts of fertilising chalk. Such additional amounts are conveniently applied some days prior to the application of the fungal mycelium/-polybutadiene/seed mixture.

What we claim is:

1. A method of facilitating vegetation in soil, comprising applying to said soil a mixture comprising (a) liquid, air-drying 1,3-butadiene homo- or copolymer and (b) a fungal mycelium biomass, whereby said butadiene polymer polymerizes in the presence of oxygen to form a lattice-like, water-permeable non-film polymer.

2. The method of claim 1 wherein the C/N ratio of the fungal mycelium biomass is not greater than 15:1.

3. A method of claim 2 wherein the C/N ratio of the fungal mass is about 8:1.

4. The method of claim 2 for use in regions where soil erosion is severe or seed germination is difficult.

5. The method of claim 4 which comprises applying from 1500 to 2000 kg of fungal mycelium biomass in admixture with 50–200 kg of polybutadiene per hectare of locus.

6. The method of claim 5, wherein the amount of polybutadiene employed is from 50 to 150 kg per hectare of locus.

7. The method of claim 6, wherein the aqueous application form comprises fertilising lime.

8. The method of claim 6, wherein the fungal mycelium biomass/polybutadiene is applied in an aqueous application form.

9. The method of claim 8, wherein the aqueous application form comprises a seed mixture.

10. A method of claim 9 in which the amount of seed mixture is 15 to 20 kilograms per 600 to 1000 liters of water.

11. A method of claim 10 in which the seed mixture comprises *Festuca rubra*.

12. A method of claim 1 in which the butadiene polymer has a maximum viscosity of 2000 mPa's at 20° C.

13. A method of claim 1 in which the butadiene polymer has a cis-1,4-double bond content of at least 30%.

14. A method of claim 1 in which the butadiene polymer has a cis-1,4-double bond content of 70% or more.

15. A method of claim 1 in which the liquid polybutadiene has a molecular weight in the range of from 500 to 20,000.

16. A method of claim 15 in which the liquid polybutadiene has a molecular weight of from 750 to 5000.

17. A method of claim 1 in which the fungal biomass is the dried granular biomass of the myceliul fungus *Penicillium chrysogenum*.

18. An application form for facilitating vegetation in soil, comprising from 150 to 200 kg of fungal mycelium biomass and from 5 to 20 kg of a liquid, air-drying 1,3-butadiene homo- or copolymer per 600 to 1000 l of water.

19. An application form according to claim 18, comprising 15 to 20 kg of seed mixture and optionally from 500 to 1500 kg of fertilising lime per 600 to 1000 l of water.

* * * * *